US011225069B2

United States Patent
Nakano et al.

(10) Patent No.: US 11,225,069 B2
(45) Date of Patent: Jan. 18, 2022

(54) INK JET METHOD AND INK JET APPARATUS

(71) Applicant: Seiko Epson Corporation, Tokyo (JP)

(72) Inventors: Keitaro Nakano, Matsumoto (JP); Kyohei Tanaka, Matsumoto (JP); Midori Sekine, Matsumoto (JP); Chigusa Sato, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/784,632

(22) Filed: Feb. 7, 2020

(65) Prior Publication Data

US 2020/0254756 A1  Aug. 13, 2020

(30) Foreign Application Priority Data

Feb. 8, 2019 (JP) .............................. JP2019-021502

(51) Int. Cl.
| | | |
|---|---|---|
| *B41J 2/135* | (2006.01) | |
| *B41J 2/435* | (2006.01) | |
| *C08L 39/04* | (2006.01) | |
| *C08L 47/00* | (2006.01) | |
| *C09D 11/38* | (2014.01) | |

(52) U.S. Cl.
CPC .............. *B41J 2/135* (2013.01); *B41J 2/435* (2013.01); *C08L 39/04* (2013.01); *C08L 47/00* (2013.01); *C09D 11/38* (2013.01); *C08L 2312/06* (2013.01)

(58) Field of Classification Search
None
See application file for complete search history.

(56) References Cited

U.S. PATENT DOCUMENTS

| | | | |
|---|---|---|---|
| 2006/0028523 A1* | 2/2006 | Hoshino | B41J 11/002 347/102 |
| 2007/0216743 A1* | 9/2007 | Makuta | C09D 11/40 347/100 |
| 2008/0055379 A1* | 3/2008 | Ishikawa | B41J 11/002 347/102 |
| 2009/0202795 A1 | 8/2009 | Hayata et al. | |
| 2012/0029108 A1* | 2/2012 | Nakane | C09D 11/101 522/26 |
| 2012/0077896 A1* | 3/2012 | Ishima | B41M 5/0047 522/75 |
| 2018/0002552 A1 | 1/2018 | Nakano et al. | |
| 2018/0208805 A1* | 7/2018 | Mieda | H01L 51/448 |

FOREIGN PATENT DOCUMENTS

| | | |
|---|---|---|
| CN | 101503587 A | 8/2009 |
| JP | 2018-009142 A | 1/2018 |

* cited by examiner

*Primary Examiner* — Erica S Lin
(74) *Attorney, Agent, or Firm* — Harness, Dickey & Pierce, P.L.C.

(57) ABSTRACT

An ink jet method includes an ejecting step of ejecting a radiation-curable ink jet composition from an ink jet head and an irradiating step of irradiating the ejected radiation-curable ink jet composition with an ultraviolet ray at an irradiation intensity of 3 to 10 W/cm$^2$ by using a light emitting diode. The radiation-curable ink jet composition contains monofunctional monomers including a nitrogen-containing monofunctional monomer. The amount of the nitrogen-containing monofunctional monomer relative to the total amount of the radiation-curable ink jet composition is 5 to 40 mass %.

16 Claims, 1 Drawing Sheet

INK JET METHOD AND INK JET APPARATUS

The present application is based on, and claims priority from JP Application Ser. No. 2019-021502, filed Feb. 8, 2019, the disclosure of which is hereby incorporated by reference herein in its entirety.

BACKGROUND

1. Technical Field

The present disclosure relates to an ink jet method and an ink jet apparatus.

2. Related Art

An ink jet recording method enables a relatively simple apparatus to record high-resolution images and has been rapidly developed in various fields. In such a method, an ink jet composition having low odor and good curability and flexibility has been widely studied. For example, JP-A-2018-9142 discloses a composition. The composition contains a predetermined amount of vinyl ether group-containing (meth)acrylate, an acrylate having a nitrogen atom and an oxygen atom, and a predetermined lactam monomer. JP-A-2018-9142 also discloses that the irradiation intensity is 1 $W/cm^2$ or less since suppressing the irradiation intensity results in a decrease in the temperature rise of a printed medium, thereby decreasing odor of a cured film.

It has been found, however, that the method described in JP-A-2018-9142 has a problem from the viewpoint of curability. In particular, when a small amount of ink is ejected to form small dots for high-resolution printing, the specific surface area of ink droplets is large, and thus, the ink droplets are likely to be susceptible to oxygen inhibition, resulting in degraded curability and degraded image quality.

SUMMARY

An ink jet method of the present disclosure includes an ejecting step of ejecting a radiation-curable ink jet composition from an ink jet head and an irradiating step of irradiating the ejected radiation-curable ink jet composition with an ultraviolet ray at an irradiation intensity of 3 to 10 $W/cm^2$ by using a light emitting diode. The radiation-curable ink jet composition contains monofunctional monomers including a nitrogen-containing monofunctional monomer. The amount of the nitrogen-containing monofunctional monomer relative to the total amount of the radiation-curable ink jet composition is 5 to 40 mass %.

In the ink jet method, the amount of the monofunctional monomers relative to the total amount of the radiation-curable ink jet composition may be 80 mass % or more.

In the ink jet method, the radiation-curable ink jet composition may contain a bi- or higher functional polymerizable compound, and the amount of the bi- or higher functional polymerizable compound relative to the total amount of the radiation-curable ink jet composition may be 15 mass % or less.

In the ink jet method, the nitrogen-containing monofunctional monomer may be a monofunctional monomer having a nitrogen-containing heterocycle or a monofunctional monomer having a cyclic amide structure.

In the ink jet method, the nitrogen-containing monofunctional monomer may be acryloyl morpholine.

In the ink jet method, irradiation energy of the ultraviolet ray may be 100 to 500 $mJ/cm^2$.

In the ink jet method, the ultraviolet ray may have an emission peak wavelength of 360 to 420 nm.

In the ink jet method, the amount of the nitrogen-containing monofunctional monomer relative to the total amount of the radiation-curable ink jet composition may be 5 to 20 mass %.

In the ink jet method, the ink jet head may include a nozzle group of plural nozzles aligned in a column direction. The ejecting step may include a scan in which a carriage having the ink jet head mounted thereon is made to scan in a scanning direction intersecting the column direction and in which the radiation-curable ink jet composition is ejected from the ink jet head. The scan may be performed plural times.

In the ink jet method, the carriage may include a radiation source mounted thereon that is disposed on a side of the ink jet head in a direction opposite to the scanning direction. The ejecting step may include a scan performed in the scanning direction. The irradiating step may be irradiating the radiation-curable ink jet composition ejected in the scan with an ultraviolet ray from the radiation source in the same scan.

In the ink jet method, the radiation-curable ink jet composition may contain an acylphosphine oxide-based polymerization initiator.

In the ink jet method, the weight of the composition ejected in the ejecting step for each dot may be 12 ng/dot or less.

The ink jet method may be a recording method of performing recording on a recording medium. The recording method includes the ejecting step including attaching the ejected radiation-curable ink jet composition to the recording medium and the irradiating step including irradiating the radiation-curable ink jet composition attached to the recording medium with the ultraviolet ray.

An ink jet apparatus of the present disclosure includes an ink jet head that ejects a radiation-curable ink jet composition and a radiation source that irradiates the ejected radiation-curable ink jet composition with an ultraviolet ray at an irradiation intensity of 3 to 10 $W/cm^2$. The radiation-curable ink jet composition to be ejected contains monofunctional monomers including a nitrogen-containing monofunctional monomer, and the amount of the nitrogen-containing monofunctional monomer relative to the total amount of the radiation-curable ink jet composition is 5 to 40 mass %.

DESCRIPTION OF EXEMPLARY EMBODIMENTS

Figure 1:
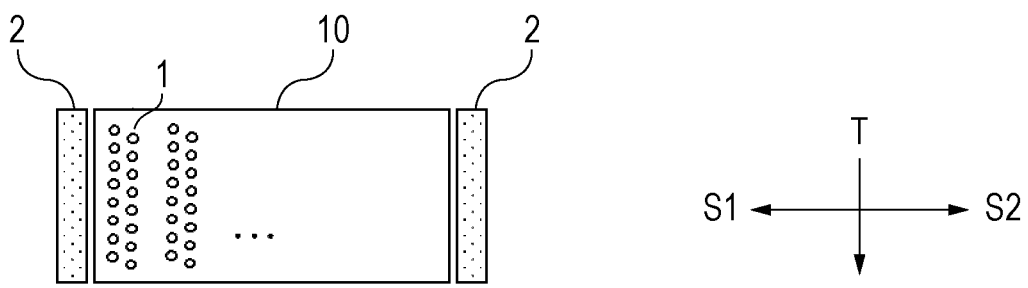
FIG. 1 is a schematic view for describing the structure of an ink jet head that can be used for the present embodiment.

Hereinafter, embodiments of the present disclosure (hereinafter, referred to as "the present embodiments") will be described in detail with reference to the drawings as needed; however, the present disclosure is not limited to the present embodiments, and various modifications can be made in the scope not departing from the gist of the disclosure. The same components in the drawings are denoted by the same symbols, and redundant descriptions are thus omitted. Positional relations, such as upper, lower, left, and right, are based on the positional relations in the drawings unless stated otherwise. The ratio of dimensions in the drawings is not limited to that given in the drawings.

In the present specification, "(meth)acryloyl" refers to at least one of acryloyls and methacryloyls corresponding thereto. "(Meth)acrylate" refers to at least one of acrylates and methacrylates corresponding thereto, and "(meth)acryl" refers to at least one of acryls and methacryls corresponding thereto. "Acryloyl" may refer to at least one of acryloyls and methacryloyls corresponding thereto. "Acrylate" may refer to at least one of acrylates and methacrylates corresponding thereto, and "acryl" may refer to at least one of acryls and methacryls corresponding thereto.

1. Ink Jet Method

The ink jet method according to the present embodiment includes an ejecting step of ejecting a radiation-curable ink jet composition having a predetermined composition (hereinafter, also simply referred to as "composition") from an ink jet head and an irradiating step of irradiating the ejected composition with an ultraviolet ray at an irradiation intensity of 3 to 10 W/cm$^2$ by using a light emitting diode.

The composition according to the present embodiment is ejected from an ink jet head by an ink jet method for use. Hereinafter, a radiation-curable ink composition will be described as an embodiment of the radiation-curable ink jet composition; however, the composition according to the present embodiment may be a composition other than an ink composition, such as a composition for 3D modelling. The ink jet method utilizes ejection of a composition from an ink jet head. Examples of the ink jet method include a recording method of performing recording and a modeling method of performing modeling. A composition used in the ink jet method is referred to as an ink jet composition. A radiation-curable composition is cured by radiation irradiation for use. In a recording method using a radiation-curable ink composition, the composition ejected from an ink jet head is attached to a recording medium in the ejecting step, and the composition attached to the recording medium is irradiated with an ultraviolet ray in the irradiating step.

When a composition in the related art is ejected to form small dots, in other words, when a small amount of ink droplets of such a composition is ejected, the individual ink droplets have a large specific surface area and thus are highly susceptible to oxygen inhibition, thereby causing problems in which curability is degraded and image quality is decreased. Such problems are more likely to occur particularly when a radiation source with a narrow wavelength range, such as a light emitting diode, is used than when a radiation source with a wide wavelength range, such as a metal halide lamp, is used. To address the problems, a nitrogen-containing monofunctional monomer has been studied for use as a monomer that is unlikely to be susceptible to oxygen inhibition and thus has excellent curability. Such a monomer enables reliable curability; however, a new problem in which streaks are generated in the obtained image has arisen.

A probable reason for this is as follows. Under the effect of the nitrogen-containing monofunctional monomer, curing progresses too rapidly. Thus, curing progresses before the ink droplets spread over a recording medium and flatten out. Therefore, the ink does not cover some portions on the recording medium, and such portions are observed as streaks. In particular, when the ultraviolet ray irradiation intensity is high, curing progresses rapidly, and streaks tends to be significantly generated. Streaks are likely to be generated in a scanning direction. A slight landing displacement of ink droplets or fluctuation in the amount of ejected ink droplets occurs in individual nozzles. Thus, streaks are readily observed in a scanning direction in which ink droplets ejected from the same nozzle are attached.

On the other hand, a method in which the ultraviolet ray irradiation intensity is decreased may be employed; however, the higher the irradiation intensity, the higher the irradiation energy, and thus, there is an advantage that main curing is achieved by a single irradiation. In particular, in a serial-type recording apparatus that will be described below, if curing can be achieved by a single irradiation, it is not necessary to provide a radiation source for post-irradiation, or a radiation source used for irradiation at a second or subsequent time performed to sufficiently cure the composition, downstream of the ink jet head. Furthermore, there is an advantage that excessively moving a radiation source for post-irradiation is not needed. To solve the above problems in which curability is degraded and image quality is decreased, irradiation intensity needs to be increased. If the irradiation intensity is decreased, excellent curability is not obtained.

Herein, "main curing" refers to curing of dots formed on a recording medium until a curing condition needed for using the printed medium is met.

Furthermore, the performance of a light emitting diode used as a radiation source of an ultraviolet ray has been improved recently, and thus, the irradiation intensity needed to perform main curing of the composition can be sufficiently obtained.

In the present embodiment, the amount of nitrogen-containing monofunctional monomer is adjusted within a predetermined range, and a radiation-curable ink composition is irradiated at a predetermined ultraviolet ray irradiation intensity and cured, in order to reliably obtain curability and to suppress the generation of streaks. Hereinafter, each step will be described in detail.

1.1. Ejecting Step

In the ejecting step, a predetermined composition is ejected from an ink jet head. More specifically, a pressure generating unit is operated to eject the composition filled in the pressure generating room of the ink jet head from a nozzle. Such an ejecting method is also referred to as an ink jet method.

Examples of the ink jet head used in the ejecting step include line heads for line-type recording and serial heads for serial-type recording.

In the line-type system using a line head, an ink jet head, for example, having a width equal to or larger than the recording width of a recording medium is fixed to an ink jet apparatus. Then, the recording medium is moved in a transporting direction (longitudinal direction of the recording medium) and ink droplets are ejected from nozzles of the ink jet head during such a movement to record an image on the recording medium. This is the line-type scan. The scanning direction is opposite to the transporting direction.

In the serial-type system using a serial head, for example, an ink jet head is mounted on a carriage that is configured to move in a width direction of a recording medium. The carriage is moved in a main scanning direction (transverse direction, width direction, scanning direction of a recording medium) and ink droplets are ejected from the openings of nozzles of the head during such a movement to record an image on the recording medium. This is the serial-type scan. Such a scan is also referred to as a main scan.

In particular, in the present embodiment, a scan in which a carriage having an ink jet head mounted thereon is made to scan in a scanning direction intersecting the column direction, the ink jet head including a nozzle group of plural nozzles aligned in a column direction, and in which a composition is ejected from the ink jet head is preferably performed. In the serial-type system, the scan is performed plural times. For more detail, a scan and a sub-scan in which the recording medium is transported in the column direction intersecting the scanning direction are alternately performed plural times.

The above problem of generation of streaks tends to occur in serial-type printers. The probable reason is that the extent to which a composition attached to the recording medium is wet and spreads and the extent to which a composition further attached to the cured composition is wet and spreads differ from each other. More specifically, in a serial-type printer, a scan is performed plural times, and thus, a composition ejected in a posterior scan lands on a composition that has been ejected, landed, and cured on the recording medium in a prior scan. When a composition ejected in the posterior scan lands on a composition that has already cured, the spread of the composition is suppressed, and thus, streaks tend to be generated. Therefore, the present disclosure is particularly useful for serial-type printers.

FIG. 1 is a schematic view for describing the structure of a carriage on which an ink jet head 10 used in the serial-type system is mounted. As illustrated in FIG. 1, a radiation source 2 is disposed on a side of the ink jet head 10 in a direction opposite to a scanning direction. Thus, ejecting a composition from nozzles 1 and irradiating the ejected composition with radiation can be performed in a single scan. This enables high-speed printing. The above "column direction" refers to the T direction in FIG. 1, and the scanning direction refers to the S1 direction or the S2 direction. As illustrated in FIG. 1, the scanning direction of the carriage refers to the S1 direction or the S2 direction, and thus, when a scan is performed in the S1 direction, "direction opposite to the scanning direction" refers to the S2 direction, and when a scan is performed in the S2 direction, "direction opposite to the scanning direction" refers to the S1 direction. The direction opposite to the scanning direction can be also stated as "downstream in the scanning direction".

In bi-directional printing, a scan in the S1 direction and a scan in the S2 direction are alternately performed. In uni-directional printing, a scan in the S1 direction or a scan in the S2 direction is performed. In bi-directional printing, a radiation source is preferably disposed on each of the S1 direction side and the S2 direction side of the ink jet head. This enables ejecting the composition from nozzles 1 and irradiating the ejected composition with radiation to be performed in the same scan both in the S1 direction and in the S2 direction.

In bi-directional printing, ejecting the composition from nozzles 1 and irradiating the ejected composition with radiation may be performed in the same scan in one of the S1 direction and the S2 direction. In such a case, a radiation source may be disposed on a side of the ink jet head in the S1 direction or in the S2 direction. In uni-directional printing, a radiation source may be disposed on a side of the ink jet head in the S1 direction or in the S2 direction.

With reference to FIG. 1, an ink jet head used in the serial-type system is described. The line-type system may have the same structure as the serial-type system, except that an ink jet head having a width equal to or larger than the recording width of a recording medium is fixed to an ink jet apparatus, that the recording medium is moved in a transporting direction (longitudinal direction of the recording medium), and that ink droplets are ejected from nozzles of the ink jet head during such a movement. In the line-type system, a radiation source is also preferably disposed on a side of the ink jet head in a direction opposite to the scanning direction.

The weight of ink for each dot, in other words, the amount of ink droplet is preferably 20 ng/dot or less, more preferably 15 ng/dot or less, still more preferably 12 ng/dot or less, furthermore, still more preferably 10 ng/dot or less, and still more preferably 8 ng/dot or less. The lower limit of the weight of ink for each dot is not particularly limited and may be 3 ng/dot or more. The weight of ink for each dot is 20 ng/dot or less, and thus, dots have a high specific surface area and are likely to be susceptible to oxygen inhibition; however, the radiation-curable ink jet composition of the present embodiment suppresses a decrease in curability, thereby obtaining high-resolution images. The weight of ink for each dot can be adjusted by, for example, adjusting the diameter of nozzles of the ink jet head or the volume of a pressure generating room or controlling the pressure generating unit that provides a driving force for ejecting ink droplets. The ink jet method preferably includes at least performing ejecting with a weight of ink for each dot within the above range and may further include performing ejecting with a weight of ink for each dot out of the above range.

In the ejecting step, the composition may be heated and ejected. The composition is more preferably heated to a temperature of 40° C. to 60° C. and still more preferably to a temperature of 40° C. to 50° C.

1.2. Irradiating Step

In the irradiating step, the radiation-curable ink jet composition that has been ejected from the ink jet head is irradiated with radiation. In particular, the radiation-curable ink jet composition that has been ejected and attached to an object to be attached is irradiated with radiation. In a recording method, a radiation-curable ink jet composition that has been attached to a recording medium is irradiated with an ultraviolet ray. Radiation irradiation starts a polymerization reaction of monomers, and the composition cures to form a coating film. At this time, when a polymerization initiator is present, active species (initiating species), such as radicals, acids, and bases, are generated. Due to the function of the initiating species, the polymerization reaction of monomers is promoted. When a photosensitizer is present, the photosensitizer absorbs an ultraviolet ray and comes to be in an excited state. In contact with the polymerization initiator, the photosensitizer promotes decomposition of the polymerization initiator, thereby further achieving the curing reaction.

The ultraviolet ray irradiation intensity at which a composition is irradiated is 3 to 10 W/cm$^2$, preferably 4 to 8 mW/cm$^2$, and more preferably 5 to 7 mW/cm$^2$. In such a case, curability is further excellent, and streaks are further decreased, which are preferable. The irradiation intensity is an intensity at which the composition is irradiated with an ultraviolet ray. In the ink jet method, the irradiation intensity is an irradiation intensity at a distance from a radiation source to an object to be attached, that is, an object to which the composition is to be attached. The object to be attached is, for example, a recording medium.

Examples of radiation herein include ultraviolet rays, infrared rays, visible rays, and X-rays. A radiation source disposed downstream of the ink jet head irradiates the composition. Among the above rays, an ultraviolet ray preferably has an emission peak wavelength of 360 to 420 nm. This tends to further improve curability.

The radiation source is not particularly limited and is, for example, an ultraviolet light emitting diode. Use of such a radiation source miniaturizes an apparatus and reduces the cost. An ultraviolet light emitting diode used as an ultraviolet ray source is small and thus can be attached to the inside of an ink jet apparatus. For example, an ultraviolet light emitting diode may be attached to a carriage (at both ends in a medium width direction and/or on a side in a medium transporting direction) on which an ink jet head that ejects the radiation-curable ink jet composition is mounted.

A carriage on which an ink jet head and a radiation source disposed on a side of the ink jet head in a direction opposite to the scanning direction are mounted is used to eject a composition in a scan performed in a scanning direction. The irradiation step is particularly preferably irradiating the composition ejected in the scan with an ultraviolet ray from the radiation source in the same scan. As described above, this enables high-speed printing and also achieves high resolution and high color development properties of an obtained recorded medium in the present embodiment.

In particular, in the serial-type system, a recording method in which a scan, in which the ink jet head moves in opposing directions, is performed plural times on a certain region of a recording medium is preferably performed. In an exemplary case, the distance of a single sub-scan is shorter than the dimension of the ink jet head in the T direction. For example, when the distance of a single sub-scan is one-fourth of the dimension of an ink jet head in the T direction, a scan in which an ink jet head moves in opposing directions is performed four times on a certain region of a recording medium. In such a case, a composition to be attached to the certain region of the recording medium can be attached separately in four scans. The number of such scans is not limited and preferably 2 or more, more preferably 2 to 20, still more preferably 3 to 16, and particularly preferably 4 to 10.

In such a serial-type system, a composition is attached in a posterior pass to a composition that has been attached and cured in a prior pass. A composition dot on the cured composition may spread in a different manner from a composition dot on a recording medium. Such a difference between spreading manners is a factor in readily generating streaks. Therefore, the present disclosure is particularly useful for an ink jet method using a serial-type system. In an ink jet method using a line-type system, a composition dot probably also cures before spreading sufficiently over a recording medium, thereby generating streaks.

The irradiation energy of the ultraviolet ray in a single irradiation is preferably 50 to 1,000 $J/cm^2$, more preferably 100 to 500 $J/cm^2$, still more preferably 150 to 400 $J/cm^2$, and still more preferably 150 to 300 $J/cm^2$. The irradiation energy in a single irradiation is within the above range, and thus, the curability of a composition tends to be further improved. When the irradiation energy is within the above range, the curability also tends to be improved by adjusting the amount of nitrogen-containing monofunctional monomer to 5 to 40 mass % relative to the total amount of composition.

In the irradiating step, main curing is preferably performed in a single irradiation. This tends to further improve printing speed.

2. Radiation-Curable Ink Jet Composition

Next, the radiation-curable ink jet composition used in the ink jet method according to the present embodiment will be described. The radiation-curable ink jet composition used in the present embodiment contains monofunctional monomers including a nitrogen-containing monofunctional monomer. The amount of nitrogen-containing monofunctional monomer is 5 to 40 mass % relative to the total amount of composition.

The radiation-curable ink jet composition of the present embodiment cures by radiation irradiation. Examples of radiation include ultraviolet rays, infrared rays, visible rays, and X-rays. Radiation is preferably an ultraviolet ray since radiation sources are available and widely used and the material appropriate for curing by ultraviolet ray irradiation is available and widely used.

Hereinafter, regarding the radiation-curable ink jet composition according to the present embodiment, components that may be contained, physical properties, and a production method will be described.

2.1. Polymerizable Compound

The radiation-curable ink jet composition contains monofunctional monomers having one polymerizable functional group and may optionally contain a polyfunctional monomer having plural polymerizable functional groups or an oligomer having one or more polymerizable functional groups. Monofunctional monomers, Polyfunctional monomers, and oligomers are collectively referred to as polymerizable compounds. The polymerizable compounds may be used alone or in a combination of two or more. In the present embodiment, a compound having a molecular weight of 1,000 or more is defined as an oligomer, and a compound having a molecular weight of less than 1,000 is defined as a monomer. Examples of the polymerizable functional group include (meth)acryloy, vinyl, and vinyl ether groups, which are preferable from the viewpoint of excellent curability. When a compound contains plural polymerizable functional groups, the compound may contain one type of polymerizable functional group or different types of polymerizable functional groups. A monomer having a (meth)acryloyl group is also referred to as an acrylate monomer. A monomer having a vinyl group is also referred to as a vinyl monomer, and a monomer having a vinyl ether group is also referred to as a vinyl ether monomer.

2.1.1. Monofunctional Monomer

The monofunctional monomers of the present embodiment include a nitrogen-containing monofunctional monomer and may optionally include an alicyclic-group containing monofunctional monomer, an aromatic-group containing monofunctional monomer, a cyclic ether-group containing monofunctional monomer, or another monofunctional monomer. Another monofunctional monomer is not particularly limited and may be a known monofunctional monomer having a polymerizable functional group, particularly, a polymerizable functional group having an unsaturated double bond between carbon atoms.

The amount of monofunctional monomers relative to the total amount of composition is preferably 50 mass % or more, more preferably 60 mass % or more or 70 mass % or more, and still more preferably 80 mass % or more. The amount of monofunctional monomers relative to the total amount of composition is 50 mass % or more, and thus, the generation of streaks is further suppressed and the adhesion tends to be further improved. In the composition of the present embodiment, as the amount of monofunctional monomers increases, the curability is further enhanced. The reason for this is presumed as follows. Many monofunctional monomers have relatively low molecular weight. When a large amount of monofunctional monomer is contained in the composition, the number of polymerizable functional groups per mass of composition increases. This may suppress susceptibility to oxygen inhibition. As the amount of monofunctional monomers increases, the generation of streaks tends to be suppressed. The probable reason is that many monofunctional monomers have relatively low viscosity, and the time for the composition to spread is reliably obtained. The upper limit of the amount of monofunctional monomers relative to the total amount of composition is preferably 92 mass % or less, more preferably 90 mass % or less, and still more preferably 88 mass % or less. The amount of monofunctional monomers relative to the total amount of composition is 92 mass % or less, and thus, scratch resistance tends to be further improved.

Hereinafter, exemplary monofunctional monomers will be described. The monofunctional monomers of the present embodiment are not limited to the monomers described below.

2.1.1.1. Nitrogen-Containing Monofunctional Monomer

Examples of the nitrogen-containing monofunctional monomer are not particularly limited and include nitrogen-containing monofunctional vinyl monomers, such as N-vinyl caprolactam, N-vinylformamide, N-vinylcarbazole, N-vinylacetamide, and N-vinylpyrrolidone; nitrogen-containing monofunctional acrylate monomers, such as acryloyl morpholine; and nitrogen-containing monofunctional acrylamide monomers, such as (meth)acrylamide, N-hydroxymethyl (meth)acrylamide, diacetone acrylamide, N,N-dimethyl (meth)acrylamide, and dimethylaminoethyl acrylate benzyl chloride quaternary salt. From the viewpoint of excellent curability, the nitrogen-containing monofunctional monomer is preferably a monofunctional monomer having a cyclic amide structure or a monofunctional monomer having a nitrogen-containing heterocycle. A nitrogen-containing heterocycle is a heterocycle containing a nitrogen atom as a component thereof.

Among the above compounds, the nitrogen-containing monofunctional monomer is preferably a nitrogen-containing monofunctional vinyl monomer or a nitrogen-containing monofunctional acrylate monomer. Among such compounds, a monomer having a cyclic structure, such as N-vinylcaprolactam, N-vinylcarbazole, N-vinylpyrrolidone, or acryloyl morpholine, is more preferable. A monofunctional monomer having a cyclic amide structure, such as N-vinylcaprolactam or N-vinylpyrrolidone, or a monofunctional monomer having a nitrogen-containing heterocycle, such as N-vinylcarbazole or acryloyl morpholine, is still more preferable. Such a nitrogen-containing monofunctional monomer suppresses gloss banding and tends to further improve the scratch resistance of the coating film. Furthermore, a monofunctional monomer having a cyclic amide structure, such as N-vinylcaprolactam, further improves the flexibility of the coating film, enhances the adhesion, and particularly enhances the curability. A monofunctional monomer having a nitrogen-containing heterocycle, such as acryloyl morpholine, tends to decrease the odor of the composition, particularly suppresses the generation of streaks, and particularly enhances the ejection stability. From the above viewpoints, a monofunctional monomer having a cyclic amide structure and a monofunctional monomer having a nitrogen-containing heterocycle are also preferably used together.

The amount of nitrogen-containing monofunctional monomer relative to the total amount of composition is preferably 5 to 40 mass %, more preferably 5 to 30 mass %, still more preferably 5 to 20 mass %, furthermore, particularly preferably, 8 to 15 mass %, more particularly preferably 10 to 14 mass %, and still more particularly preferably 10 to 13 mass %. The amount of nitrogen-containing monofunctional monomer is within the above range, and thus, the curability is further enhanced, and the generation of streaks is further suppressed. In addition, the scratch resistance and the adhesion of a coating film are further improved. The nitrogen-containing monofunctional monomer has high curability and is thus likely to form an unexpected substance at a nozzle due to light leakage from a radiation source, thereby causing faulty ejection. The amount of nitrogen-containing monofunctional monomer is within the above range, and thus, such faulty ejection is also suppressed.

When the radiation-curable composition contains a monofunctional monomer that is not a nitrogen-containing monofunctional monomer, the amount of such a monofunctional monomer relative to the total mass of the composition is preferably 30 to 85 mass %, more preferably 40 to 80 mass %, and still more preferably 70 to 75 mass %. Furthermore, the amount of monofunctional monomer that is not a nitrogen-containing monofunctional monomer may be any of the preferable amounts of various monofunctional monomers, which will be described later.

2.1.1.2. Alicyclic Group-Containing Monofunctional Monomer

Examples of the alicyclic group-containing monofunctional monomer are not particularly limited and include monomers having a monocyclic hydrocarbon group, such as tert-butylcyclohexanol acrylate (TBCHA) and 1,4-dioxaspiro[4,5]dec-2-ylmethyl 2-(meth)acrylate; monomers having a unsaturated polycyclic hydrocarbon group, such as dicyclopentenyl acrylate and dicyclopentenyloxyethyl acrylate; and monomers having a saturated polycyclic hydrocarbon group, such as dicyclopentanyl acrylate and isobornyl acrylate. Among such compounds, a monomer having an unsaturated polycyclic hydrocarbon group is preferable, and at least dicyclopentenyl acrylate is more preferably contained. Such an alicyclic group-containing monofunctional monomer tends to further improve the scratch resistance of the coating film.

The amount of alicyclic group-containing monofunctional monomer relative to the total amount of composition is preferably 15 to 45 mass %, more preferably 20 to 40 mass %, and still more preferably 25 to 35 mass %. The amount of alicyclic group-containing monofunctional monomer is within the above range, and thus, the scratch resistance of the coating film tends to be further improved.

2.1.1.3. Aromatic Group-Containing Monofunctional Monomer

Examples of the aromatic group-containing monofunctional monomer are not particularly limited and include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate. Among such compounds, phenoxyethyl (meth)acrylate or benzyl (meth)acrylate is preferable, phenoxyethyl (meth)acrylate is more preferable, and phenoxyethyl acrylate (PEA) is still more preferable. Such an aromatic group-containing monofunctional monomer further improves the solubility of a polymerization initiator and tends to further improve the curability of the composition. In particular, when an acylphosphine oxide-based polymerization initiator or a thioxanthone-based polymerization initiator is used, such an aromatic group-containing monofunctional monomer tends to enhance the solubility of the acylphosphine oxide-based polymerization initiator or the thioxanthone-based polymerization initiator. Furthermore, phenoxyethyl (meth)acrylate further tends to decrease odor.

In another expression, examples of the aromatic group-containing monofunctional monomer include compounds represented by the following general formula (3) and compounds represented by the following general formula (4).

$$CH_2=CR^4-COOR^5-Ar \quad (3)$$

$$CH_2=CR^4-COO-Ar \quad (4)$$

(in formulas (3) and (4), $R^4$ is a hydrogen atom or a methyl group. In formula (3), Ar representing an aromatic ring skeleton has at least one aryl group and is an monovalent organic residue in which a carbon atom forming the aryl group is bonded to a group represented by $R^5$, $R^5$ being a C1 to C4 divalent organic residue. In formula (4), Ar representing an aromatic ring skeleton has at least one aryl group and is a monovalent organic residue in which a carbon atom forming the aryl group is bonded to —COO— in the formula.)

In the above-described general formula (3), preferable examples of the group represented by $R^5$ include optionally substituted linear, branched, or cyclic, C1 to C4 alkylene groups and optionally substituted C1 to C4 alkylene groups having an oxygen atom of ether bond and/or ester bond in the structure thereof. Among such groups, a C1 to C4 alkylene group, such as ethylene, n-propylene, isopropylene, or butylene, or a C1 to C4 alkylene group having an oxygen atom of an ether bond in the structure thereof, such as oxyethylene, oxy-n-propylene, oxyisopropylene, or oxybutylene, is suitably used. When the organic residue is an optionally substituted group, examples of the substituent are not particularly limited and include carboxyl, alkoxy, hydroxyl, and halo groups. When the substituent contains a carbon atom, the carbon atom is counted as the carbon atom of the organic residue.

In the above general formulas (3) and (4), examples of at least one aryl group contained in Ar (aryl) (aromatic ring skeleton) include, but are not limited to, phenyl and naphthyl. The number of aryl groups is one or more and preferably one or two. Among carbon atoms forming the aryl group, a carbon atom may be substituted, except for a carbon atom bonded to the organic residue represented by $R^5$ in formula (3), a carbon atom bonded to —COO— in formula (4), and a carbon atom that connects aryl groups together when plural aryl groups are contained. When a carbon atom is substituted, the number of substitutions per aryl group is one or more and preferably one or two. Examples of the substituent are not particularly limited and include linear, branched, or cyclic C1 to C10 alkyl and alkoxy groups, carboxyl, halo, and hydroxyl groups.

The amount of aromatic group-containing monofunctional monomer relative to the total amount of composition is preferably 5 to 50 mass %, more preferably 10 to 45 mass %, and still more preferably 15 to 35 mass %. The amount of aromatic group-containing monofunctional monomer is within the above range, and thus, the odor is further reduced, and the scratch resistance of the coating film tends to be further improved.

2.1.1.3. Cyclic Ether Group-Containing Monofunctional Monomer

Examples of the cyclic ether group-containing monofunctional monomer are not particularly limited and include tetrahydrofurfuryl acrylate and cyclic trimethylolpropane formal acrylate. Such a monomer decreases the odor of the composition and tends to further improve the scratch resistance.

The amount of cyclic ether group-containing monofunctional monomer relative to the total amount of composition is preferably 2 to 20 mass %, more preferably 3 to 15 mass %, and still more preferably 5 to 12 mass %. The amount of cyclic ether group-containing monofunctional monomer is within the above range, and thus, the odor of the composition is decreased, and the scratch resistance tends to be further improved.

2.1.1.4. Aliphatic Group-Containing Monofunctional Monomer

Examples of an aliphatic group-containing monofunctional monomer are not particularly limited and include isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth)acrylate, 2-hydroxypropyl (meth)acrylate, and lactone-modified flexible (meth)acrylate. Such an aliphatic group-containing monofunctional monomer tends to further improve the curability of the composition.

2.1.1.4. Another Monofunctional Monomer

In addition to the above monomers, another monofunctional monomer may be used. Examples of such a monomer include unsaturated carboxylic acids, such as (meth)acrylate, itaconic acid, crotonic acid, isocrotonic acid, and maleic acid; salts of such unsaturated carboxylic acids; esters, urethanes, amides, and anhydrides of unsaturated carboxylic acids; acrylonitrile, styrene, various unsaturated polyesters, unsaturated polyethers, unsaturated polyamides, and unsaturated urethanes. For example, monourethane acrylate may be used.

2.1.2. Polyfunctional Monomer

Examples of a polyfunctional monomer of the present embodiment include vinyl ether group-containing (meth)acrylates, bifunctional (meth)acrylates, and tri- or higher polyfunctional (meth)acrylate. The polyfunctional monomer is not limited to the above examples.

The amount of polyfunctional monomer relative to the total amount of composition is preferably 1 to 35 mass %, more preferably 2 to 25 mass %, and still more preferably 2 to 15 mass %. The amount of polyfunctional monomer relative to the total amount of composition is within the above range, and thus, the scratch resistance and the adhesion tend to be further improved.

Hereinafter, exemplary polyfunctional monomers will be described. The polyfunctional monomer of the present embodiment is not limited to the monomers described below.

2.1.2.1 Vinyl Ether Group-Containing (Meth)acrylate

Examples of the vinyl ether group-containing (meth)acrylate are not particularly limited and include compounds represented by formula (1) described below. Such a vinyl ether group-containing (meth)acrylate decreases the viscosity of the composition, tends to further improve the ejection stability, and also further improves the curability of the composition. As the curability is improved, recording speed can be further increased.

$$CH_2=CR^1-COOR^2-O-CH=CH-R^3 \quad (1)$$

(In the formula, $R^1$ is a hydrogen atom or methyl, $R^2$ is a C2 to C20 divalent organic residue, and $R^3$ is a hydrogen atom or a C1 to C11 monovalent organic residue.)

In the above-described formula (1), examples of the C2 to C20 divalent organic residue represented by $R^2$ include optionally substituted linear, branched, or cyclic C2 to C20 alkylene groups, optionally substituted C2 to C20 alkylene groups having an oxygen atom of an ether bond and/or ester bond in the structure thereof, and optionally substituted C6 to C11 divalent aromatic groups. Among these groups, a C2 to C6 alkylene group, such as ethylene, n-propylene, isopropylene, or butylene, or a C2 to C9 alkylene group having an oxygen atom of an ether bond in the structure thereof, such as oxyethylene, oxy n-propylene, oxyisopropylene, or oxybutylene, is preferable. To further decrease the viscosity of the composition and to further improve the curability of the composition, a compound having a glycol ether chain, in which $R^2$ is a C2 to C9 alkylene group having an oxygen atom of an ether bond in the structure thereof, such as oxyethylene, oxy n-propylene, oxyisopropylene, or oxybutylene, is more preferable.

In the above-described formula (1), suitable examples of the C1 to C11 monovalent organic residue represented by $R^3$ include optionally substituted linear, branched, or cyclic C1 to C10 alkyl groups and optionally substituted C6 to C11 aromatic groups. Among these groups, a C1 to C2 alkyl group, such as methyl or ethyl, or a C6 to C8 aromatic group, such as phenyl or benzyl, is suitably used.

When the above-described organic residues are optionally substituted groups, substituents are divided into groups containing a carbon atom and groups containing no carbon atom. First, when the substituent is a group containing a carbon atom, the carbon atom is counted as the carbon atom of the organic residue. Examples of the group containing a carbon atom include, but are not limited to, carboxyl and alkoxy groups. Next, examples of the group containing no carbon atom include, but are not limited to, hydroxyl and halo groups.

Specific examples of the compound represented by formula (1) are not particularly limited and include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth) acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxy)ethyl (meth) acrylate, polyethylene glycol monovinyl ether (meth)acrylate, and polypropylene glycol monovinyl ether (meth)acrylate. Among these specific examples, from the viewpoint of the curability of the composition and ease of balancing the viscosity, 2-(2-vinyloxyethoxy)ethyl acrylate is particularly preferable. In the present embodiment, 2-(2-vinyloxyethoxy) ethyl acrylate may be referred to as VEEA.

The amount of vinyl ether group-containing (meth)acrylate relative to the total amount of composition is preferably 1 to 30 mass %, more preferably 1 to 25 mass %, and still more preferably 1 to 15 mass %. The amount of vinyl ether group-containing (meth)acrylate is within the above range, and thus, the viscosity of the composition is decreased, and the curability tends to be further improved.

2.1.2.2 Bifunctional (Meth)acrylate

Examples of the bifunctional (meth)acrylate are not particularly limited and include dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-EO (ethylene oxide) adduct di(meth)acrylate, bisphenol A-PO (propylene oxide) adduct di(meth)acrylate, hydroxypivalic acid neopentyl glycol di(meth)acrylate, and poly(tetramethylene glycol) di(meth)acrylate.

The amount of bifunctional (meth)acrylate relative to the total amount of composition is preferably 1 to 25 mass %, more preferably 1 to 15 mass %, and still more preferably 1 to 10 mass %. The amount of bifunctional (meth)acrylate is within the above range, and thus, the curability tends to be further increased.

2.1.2.3 Tri- or Higher Polyfunctional (Meth)acrylate

Examples of the tri- or higher polyfunctional (meth) acrylate are not particularly limited and include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa (meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

2.2.3. Oligomer

The oligomer of the present embodiment is a multimer, such as a dimer or a trimer, that contains a polymerizable compound as a component, and is a compound having one or more polymerizable functional groups. The polymerizable compound herein is not limited to the above-described monofunctional monomers and polyfunctional monomers.

Examples of such an oligomer are not particularly limited and include urethane acrylate oligomers in which a repeating unit is an urethane, polyester acrylate oligomers in which a repeating unit is an ester, and epoxy acrylate oligomers in which a repeating unit is an epoxy.

Among these oligomers, an urethane acrylate oligomer is preferable, an aliphatic urethane acrylate oligomer or an aromatic urethane acrylate oligomer is more preferable, and an aliphatic urethane acrylate oligomer is still more preferable. Regarding an urethane acrylate oligomer, a tetra- or lower functional urethane acrylate oligomer is preferable, and a bifunctional urethane acrylate oligomer is more preferable.

Such an oligomer further improves the storage stability of the composition and tends to further improve the scratch resistance.

The amount of oligomer relative to the total amount of composition is preferably 1 to 10 mass %, more preferably 3 to 9 mass %, and still more preferably 4 to 7 mass %. The amount of oligomer is within the above range, and thus, the storage stability of the composition is further improved, and the scratch resistance of the coating film tends to be further improved.

The radiation-curable ink jet composition preferably contains a bi- or higher functional polymerizable compound. Herein, a bi- or higher functional polymerizable compound refers to a polyfunctional monomer or a bi- or higher functional oligomer. The amount of bi- or higher functional polymerizable compound relative to the total amount of composition is preferably 40 mass % or less, more preferably 30 mass % or less, still more preferably 15 mass % or less, and particularly preferably 10 mass % or less. The lower limit of the amount of bi- or higher functional polymerizable compound is not particularly limited and is preferably 3 mass % or more and more preferably 5 mass % or more. The amount of bi- or higher functional polymerizable compound is within the above range, and thus, portions that differ in gloss from each other tend not to be generated.

2.2. Polymerization Initiator

The radiation-curable ink jet composition according to the present embodiment preferably contains a polymerization initiator that generates active species when irradiated with radiation. Polymerization initiators may be used alone or in a combination of two or more.

Examples of the polymerization initiator are not particularly limited and include known polymerization initiators, such as acylphosphine oxide-based polymerization initiators, alkylphenone-based polymerization initiators, titanocene-based polymerization initiators, and thioxanthone-based polymerization initiators. Among these polymerization initiators, an acylphosphine oxide-based polymerization initiator is preferable. Such a polymerization initiator further improves the curability of the composition and tends to further improve the curability obtained particularly by a curing process using UV-LED light.

Examples of the acylphosphine oxide-based polymerization initiator are not particularly limited and include 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentylphosphine oxide.

Examples of a commercially available product of such an acylphosphine oxide-based polymerization initiator include IRGACURE 819 (bis(2,4,6-trimethylbenzoyl)-phenylphosphine oxide), IRGACURE 1800 (mixture of bis-(2,6-dimethoxybenzoyl)-2,4,4-trimethylpentylphosphine oxide and 1-hydroxy-cyclohexyl phenyl ketone in a mass ratio of 25:75), and IRGACURE TPO (2,4,6-trimethylbenzoyldiphenylphosphine oxide), which are all manufactured by BASF.

The amount of polymerization initiator relative to the total amount of composition is preferably 1 to 15 mass %, more preferably 2.5 to 12.5 mass %, and still more preferably 5 to 10 mass %. The amount of polymerization initiator is within the above range, and thus, the curability of the composition and the solubility of the polymerization initiator tend to be further improved.

2.3. Other Additives

The radiation-curable ink jet composition according to the present embodiment may optionally further contain an additive, such as a colorant, a dispersant, a polymerization inhibitor, a surfactant, or a photosensitizer.

2.3.1. Colorant

The radiation-curable ink jet composition according to the present embodiment may further contain a colorant. The radiation-curable ink jet composition according to the present embodiment contains a colorant and thus is used as a colored radiation-curable ink jet composition. At least one of pigments or dyes may be used as the colorant. From the viewpoint of particularly excellent curability and particularly excellent suppression of the generation of streaks, a color ink used for coloring is preferable, and a chromatic color ink or a black ink is more preferable. Examples of the color of the chromatic color ink include cyan, yellow, magenta, orange, and green.

The total amount of colorant relative to the total amount of composition is preferably 1 to 20 mass %, more preferably 1 to 15 mass %, and still more preferably 1 to 10 mass %. The radiation-curable ink jet composition according to the present embodiment may be a clear ink that contains no colorant or that contains a colorant in an amount not enough for coloring, for example, 0.1 mass % or less.

2.3.1.1. Pigment

A pigment used as a colorant improves the lightfastness of the radiation-curable ink jet composition. As a pigment, an inorganic pigment or an organic pigment may be used. The pigments are used alone or in a combination of two or more.

As the inorganic pigment, carbon black (C.I. (Colour Index Generic Name) Pigment Black 7), such as furnace black, lampblack, acetylene black, or channel black, iron oxide, or titanium oxide may be used.

Examples of the organic pigment include azo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates (e.g., basic dye-type chelates and acidic dye-type chelates), stained lakes (basic dye-type lakes and acidic dye-type lakes), nitro pigments, nitroso pigments, aniline black, and daylight fluorescent pigments.

Further specific examples of carbon black used for black include No. 2300, No. 900, MCF88, No. 33, No. 40, No. 45, No. 52, MA7, MA8, MA100, and No. 2200B (the above manufactured by Mitsubishi Chemical Corporation); Raven 5750, Raven 5250, Raven 5000, Raven 3500, Raven 1255, and Raven 700 (the above manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (the above manufactured by CABOT JAPAN K.K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (the above manufactured by Degussa).

Examples of the pigment used for white include C.I. Pigment White 6, 18, and 21.

Examples of the pigment used for yellow include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of the pigment used for magenta include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. pigment violet 19, 23, 32, 33, 36, 38, 43, and 50.

Examples of the pigment used for cyan include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments used for colors other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The amount of pigment relative to the total amount of composition is preferably 1 to 20 mass %, more preferably 1 to 15 mass %, and still more preferably 1 to 10 mass %.

2.3.1.2. Dye

A dye may be used as a colorant. The dye is not particularly limited. An acid dye, a direct dye, a reactive dyes, or a basic dye can be used. Dyes may be used alone or in a combination of two or more.

2.3.2. Dispersant

When the radiation-curable ink jet composition contains a pigment, to further enhance pigment dispersibility, the radiation-curable ink jet composition may further include a dispersant. Dispersants may be used alone or in a combination of two or more.

The dispersant is not particularly limited. The dispersant may be a dispersant typically used to prepare a pigment dispersion liquid, such as a polymer dispersant. Specific examples of the dispersant include dispersants mainly containing one or more of polyoxyalkylene polyalkylene polyamines, vinyl-based polymers and copolymers, acryl-based polymers and copolymers, polyesters, polyamides, polyimides, polyurethanes, amino-based polymers, silicon-containing polymers, sulfur-containing polymers, fluorine-containing polymers, and epoxy resins.

Examples of commercially available products of the polymer dispersant include Aji Super series manufactured by Ajinomoto Fine-Techno Co., Inc., Solsperse series available from Avecia and Noveon (e.g., Solsperse 36000), Disperbic series manufactured by BYK Additives & Instruments, and DISPARLON series manufactured by Kusumoto Chemicals, Ltd.

The amount of dispersant relative to the total amount of composition is preferably 0.05 to 2 mass %, more preferably 0.05 to 1 mass %, and still more preferably 0.05 to 0.5 mass %.

2.3.3. Polymerization Inhibitor

The radiation-curable ink jet composition according to the present embodiment may further contain a polymerization inhibitor. Polymerization inhibitors may be used alone or in a combination of two or more.

Examples of the polymerization inhibitor include, but are not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The amount of polymerization inhibitor relative to the total amount of composition is preferably 0.05 to 1 mass % and more preferably 0.05 to 0.5 mass %.

2.3.4. Surfactant

The radiation-curable ink jet composition according to the present embodiment may further contain a surfactant. Surfactants may be used alone or in a combination of two or more.

The surfactant is preferably a silicone-based surfactant and more preferably a polyester-modified silicone or a polyether-modified silicone. Examples of the polyether-modified silicone include BYK-378 and 3455 and BYK-UV 3500, 3510, and 3530 (manufactured by BYK Additives & Instruments). The polyester-modified silicone may be BYK-3570 (manufactured by BYK Additives & Instruments).

The amount of surfactant relative to the total amount of composition is preferably 0.01 to 2 mass % and more preferably 0.05 to 1 mass %.

2.3.5. Photosensitizer

The radiation-curable ink jet composition according to the present embodiment may further contain a photosensitizer. Examples of the photosensitizer include amine compounds (e.g., aliphatic amines, aromatic-group containing amines, piperidine, reaction products of an epoxy resin and an amine, and triethanolamine triacrylate), urea compounds (e.g., allylthiourea and o-tolylthiourea), sulfur compounds (e.g., sodium diethyldithiophosphate and soluble aromatic sulfinic acid salts), nitrile-based compounds (e.g., N,N-diethyl-p-aminobenzonitrile), phosphorus compounds (e.g., tri-n-butylphosphine and sodium diethyldithiophosphide), nitrogen compounds (Michler's ketones, N-nitrosohydroxylamine derivatives, oxazolidine compounds, tetrahydro-1,3-oxazine compounds, condensates of a diamine and formaldehyde or acetaldehyde, and chlorine compounds (e.g., carbon tetrachloride and hexachloroethane).

2.4. Method for Producing Composition

The radiation-curable ink jet composition is produced (prepared) by mixing components of the composition and performing stirring such that the components are sufficiently and uniformly mixed together. In the present embodiment, the preparation of the radiation-curable ink jet composition preferably includes, during preparation, subjecting a mixture in which the polymerization initiator and at least a portion of the monomers are mixed together to at least one of ultrasonic treatment and heating treatment. This decreases the amount of oxygen dissolved in the composition after the preparation, thereby producing a radiation-curable ink jet composition having excellent ejection stability and excellent storage stability. The above-described mixture contains at least the above-described components and may further contain another component of the radiation-curable ink jet composition or may contain all the components of the radiation-curable ink jet composition. At least a portion of the monomers of the radiation-curable ink jet composition is contained in the mixture.

3. Ink Jet Apparatus

The ink jet apparatus of the present embodiment includes an ink jet head that ejects a predetermined composition and a radiation source that irradiates the ejected composition with an ultraviolet ray at an irradiation intensity of 3 to 10 $W/cm^2$. The ink jet apparatus uses the above-described radiation-curable ink jet composition as the composition.

An ink jet apparatus of the present embodiment may be a line-type or serial-type apparatus; however, the ink jet apparatus is preferably a serial-type apparatus that includes a carriage on which an ink jet head is mounted, the ink jet head ejecting the radiation-curable ink jet composition while the carriage is scanning in a width direction of a recording medium. In particular, when an ink jet head is a serial type, a carriage on which the ink jet head is mounted preferably includes a radiation source mounted thereon that is disposed on a side of the ink jet head in a direction opposite to the scanning direction. As described above, this enables high-speed printing and also achieves high-resolution and high color development properties of an obtained recorded medium while suppressing generation of streaks, in the present embodiment.

Figure 2:
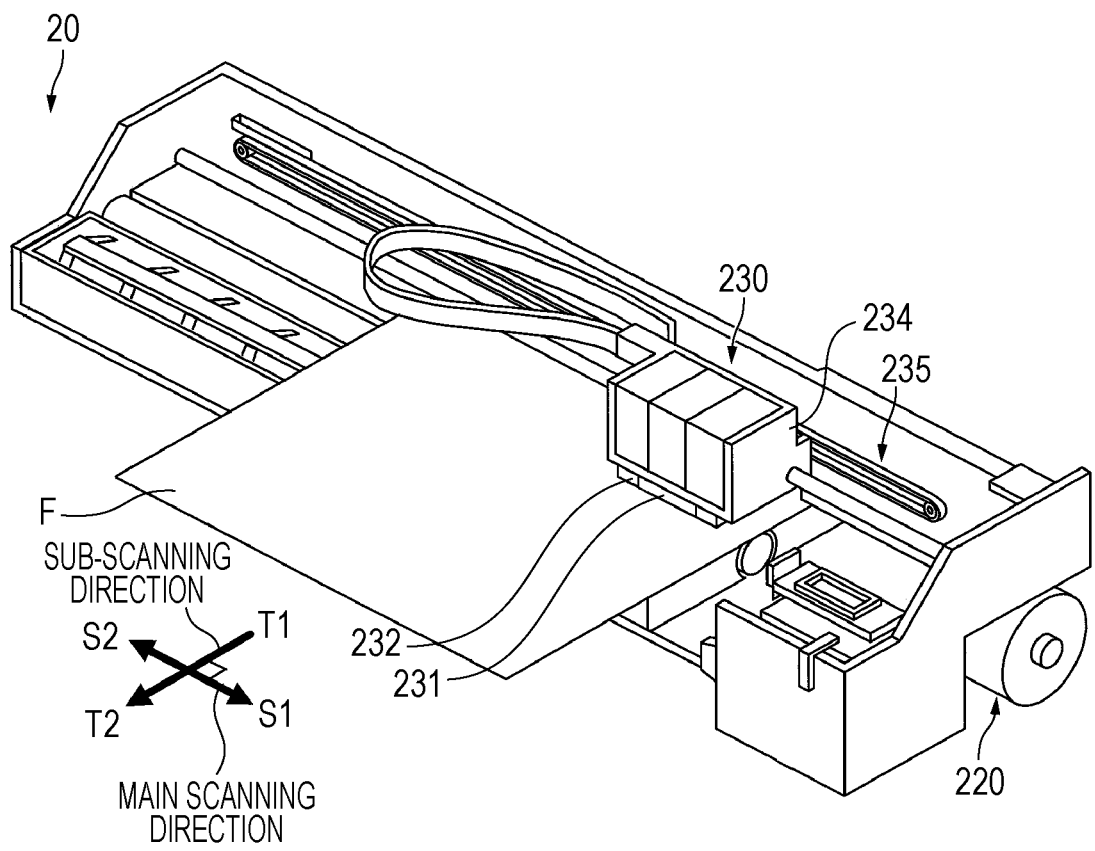
FIG. 2 is a perspective view of a serial-type ink jet apparatus of the present embodiment.

As an exemplary ink jet apparatus, FIG. 2 illustrates a perspective view of a serial printer. As illustrated in FIG. 2, a serial printer 20 includes a transporting unit 220 and a recording unit 230. The transporting unit 220 transports a recording medium F supplied to the serial printer to the recording unit 230 and discharges the recorded recording medium out of the serial printer. Specifically, the transporting unit 220 has transporting rollers and transports the supplied recording medium F in the sub-scanning direction T1.

The recording unit 230 includes an ink jet head 231 that ejects a composition onto the recording medium F transported from the transporting unit 220, a radiation source 232 that irradiates the attached composition with an ultraviolet ray, a carriage 234 on which the ink jet head 231 and the radiation source 232 are mounted, and a carriage moving mechanism 235 that moves the carriage 234 in the main scanning directions S1 and S2 of the recording medium F.

A serial printer includes a head, as the ink jet head 231, having a length smaller than the width of a recording medium. The head moves, and recording is performed in the plural scans. In a serial printer, the head 231 and the radiation source 232 are mounted on the carriage 234 that moves in a predetermined direction. As the carriage moves, the head moves and ejects the composition onto a recording medium to perform recording. Pass is also referred to as a main scan. Between the passes, a sub-scan in which a recording medium is transported is performed. In other words, a main scan and a sub-scan are alternately performed.

In FIG. 2, an aspect in which a radiation source is mounted on a carriage is illustrated; however, the ink jet apparatus is not limited to the aspect and may include a radiation source not mounted on a carriage.

The ink jet apparatus of the present embodiment is not limited to the above-described serial-type printer and may be the above-described line-type printer.

4. Recorded Medium

A recorded medium of the present embodiment is a recording medium to which the above-described radiation-curable ink jet composition has been attached and on which the attached composition has cured. The composition has good flexibility and adhesion, and thus, occurrence of a crack or rupture of a coating film is suppressed during post processing, such as cutting and folding. Therefore, the recorded medium of the present embodiment can be suitably used for, for example, signature.

Examples of the material of the recording medium are not particularly limited and include plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal, above plastics with a surface processed and treated, glass, paper, metal, and wood.

Examples of the form of the recording medium are not also particularly limited and include films, boards, and cloths.

EXAMPLES

Hereinafter, the present disclosure will be further specifically described by using examples. The present disclosure is not limited to the following examples.

1. Preparation of Ink Jet Composition

First, a colorant, a dispersant, a portion of each monomer were weighed and put into a tank for pigment dispersion. Ceramic beads having a diameter of 1 mm for milling were put into the tank and stirred to obtain a pigment dispersion liquid in which the colorant was dispersed in the monomers. Next, the remaining monomers, a polymerization initiator, and a polymerization inhibitor were put into a tank for mixture, which is a stainless container, so as to have a composition in Table 1 and mixed together and stirred to be completely dissolved. Thereafter, the above pigment dispersion liquid was put into the mixture and further mixed together and stirred for an hour at room temperature. The resulting mixture was filtered through a membrane filter with a pore size of 5 μm to obtain a radiation-curable ink jet composition in each example. The numerical values of each component in examples in Table 1 are given in mass %.

TABLE 1

| | | Ink No. | | | | | | |
|---|---|---|---|---|---|---|---|---|
| | | 1 | 2 | 3 | 4 | 5 | 6 | 7 |
| Nitrogen-containing monofunctional monomer | ACMO | 10.0 | 15.0 | 20.0 | 25.0 | 25.0 | 5.0 | — |
| | n-VC | — | — | — | — | 15.0 | — | 10.0 |
| Other monofunctional monomers | PEA | 30.2 | 27.2 | 25.2 | 23.2 | 15.2 | 35.2 | 30.2 |
| | IBXA | 25.0 | 23.0 | 20.0 | 17.0 | 10.0 | 25.0 | 25.0 |
| | DCPA | 5.0 | 5.0 | 5.0 | 5.0 | 5.0 | 5.0 | 5.0 |
| | THFA | 5.0 | 5.0 | 5.0 | 5.0 | 5.0 | 5.0 | 5.0 |
| | CTFA | 5.0 | 5.0 | 5.0 | 5.0 | 5.0 | 5.0 | 5.0 |
| Polyfunctional monomer | VEEA | 2.0 | 2.0 | 2.0 | 2.0 | 2.0 | 2.0 | 2.0 |
| | DPGDA | 2.0 | 2.0 | 2.0 | 2.0 | 2.0 | 2.0 | 2.0 |
| Oligomer | CN991 | 5.0 | 5.0 | 5.0 | 5.0 | 5.0 | 5.0 | 5.0 |
| Polymerization initiator | Ir819 | 4.0 | 4.0 | 4.0 | 4.0 | 4.0 | 4.0 | 4.0 |
| | TPO | 4.0 | 4.0 | 4.0 | 4.0 | 4.0 | 4.0 | 4.0 |
| Pigment | Carbon black | 2.0 | 2.0 | 2.0 | 2.0 | 2.0 | 2.0 | 2.0 |
| Dispersant | SOL36000 | 0.2 | 0.2 | 0.2 | 0.2 | 0.2 | 0.2 | 0.2 |
| Polymerization inhibitor | MEHQ | 0.1 | 0.1 | 0.1 | 0.1 | 0.1 | 0.1 | 0.1 |

TABLE 1-continued

| Surfactant | BYK-UV3500 | 0.5 | 0.5 | 0.5 | 0.5 | 0.5 | 0.5 | 0.5 |
|---|---|---|---|---|---|---|---|---|
| Total | | 100.0 | 100.0 | 100.0 | 100.0 | 100.0 | 100.0 | 100.0 |
| Nitrogen-containing monofunctional monomer content (mass %) | | 10.0 | 15.0 | 20.0 | 25.0 | 40.0 | 5.0 | 10.0 |
| Monofunctional monomer content (mass %) | | 80.2 | 80.2 | 80.2 | 80.2 | 80.2 | 80.2 | 80.2 |

| | | Ink No. | | | | | |
|---|---|---|---|---|---|---|---|
| | | 8 | 9 | 10 | 11 | 12 | 13 |
| Nitrogen-containing monofunctional monomer | ACMO | — | 15.0 | 15.0 | — | 3.0 | 30.0 |
| | n-VC | 15.0 | — | — | — | — | 15.0 |
| Other monofunctional monomers | PEA | 27.2 | 24.2 | 18.2 | 35.2 | 32.2 | 10.2 |
| | IBXA | 23.0 | 19.0 | 11.0 | 30.0 | 30.0 | 10.0 |
| | DCPA | 5.0 | 4.0 | 3.0 | 5.0 | 5.0 | 5.0 |
| | THFA | 5.0 | 4.0 | 3.0 | 5.0 | 5.0 | 5.0 |
| | CTFA | 5.0 | 4.0 | 3.0 | 5.0 | 5.0 | 5.0 |
| Polyfunctional monomer | VEEA | 2.0 | 12.0 | 26.0 | 2.0 | 2.0 | 2.0 |
| | DPGDA | 2.0 | 2.0 | 5.0 | 2.0 | 2.0 | 2.0 |
| Oligomer | CN991 | 5.0 | 5.0 | 5.0 | 5.0 | 5.0 | 5.0 |
| Polymerization initiator | Ir819 | 4.0 | 4.0 | 4.0 | 4.0 | 4.0 | 4.0 |
| | TPO | 4.0 | 4.0 | 4.0 | 4.0 | 4.0 | 4.0 |
| Pigment | Carbon black | 2.0 | 2.0 | 2.0 | 2.0 | 2.0 | 2.0 |
| Dispersant | SOL36000 | 0.2 | 0.2 | 0.2 | 0.2 | 0.2 | 0.2 |
| Polymerization inhibitor | MEHQ | 0.1 | 0.1 | 0.1 | 0.1 | 0.1 | 0.1 |
| Surfactant | BYK-UV3500 | 0.5 | 0.5 | 0.5 | 0.5 | 0.5 | 0.5 |
| Total | | 100.0 | 100.0 | 100.0 | 100.0 | 100.0 | 100.0 |
| Nitrogen-containing monofunctional monomer content (mass %) | | 15.0 | 15.0 | 15.0 | 0.0 | 3.0 | 45.0 |
| Monofunctional monomer content (mass %) | | 80.2 | 70.2 | 53.2 | 80.2 | 80.2 | 80.2 |

The abbreviations and the components of the products in Table 1 are as follows.

Monofunctional Monomer

ACMO (manufactured by KJ CHEMICALS CORPORATION, acryloyl morpholine)

NVC (manufactured by ISP JAPAN LTD., N-vinylcaprolactam)

PEA (product name "Viscoat #192" manufactured by OSAKA ORGANIC CHEMICAL INDUSTRY LTD., phenoxyethyl acrylate)

IBXA (manufactured by OSAKA ORGANIC CHEMICAL INDUSTRY LTD., isobornyl acrylate)

DCPA (manufactured by Hitachi Chemical Company, Ltd., dicyclopentenyl acrylate)

THFA (manufactured by Hitachi Chemical Company, Ltd., tetrahydrofurfuryl acrylate)

CTFA (product name "Viscoat #200", manufactured by OSAKA ORGANIC CHEMICAL INDUSTRY LTD., cyclic trimethylolpropane formal acrylate)

Polyfunctional Monomer

VEEA (manufactured by NIPPON SHOKUBAI CO., LTD., 2-(2-vinyloxyethoxy) ethyl acrylate)

DPGDA (product name "SR508", manufactured by Sartomer Co., dipropyleneglycol diacrylate)

Oligomer

CN991 (manufactured by Sartomer Co., bifunctional urethane acrylate oligomer)

Polymerization Initiator

Irg. 819 (product name "IRGACURE 819" manufactured by BASF, bis(2,4,6-trimethylbenzoyl)-phenylphosphine oxide)

TPO (product name "IRGACURE TPO", manufactured by BASF, 2,4,6-trimethylbenzoyldiphenylphosphine oxide)

Dispersant

Solsperse 36000 (manufactured by The Lubrizol Corporation, polymer dispersant)

Colorant (Pigment)

carbon black (product name "MA-100", manufactured by Mitsubishi Chemical Corporation)

Polymerization Inhibitor

MEHQ (product name "p-methoxyphenol", manufactured by KANTO CHEMICAL CO., INC., hydroquinone monomethyl ether)

Surfactant

BYK-UV3500 (manufactured by BYK Additives & Instruments, polyether-modified polydimethylsiloxane having an acryloyl group)

2. Recording Test 2.1. Printer Structure P1

Printer structure P1 was a serial printer produced by modifying an ink jet recording apparatus (product name "SC-530650", manufactured by SEIKO EPSON CORPORATION). The nozzle density of the ink jet head was 300 npi. The number of nozzles was 300. The diameter of a nozzle was 20 μm. The length of the head was 4 inches. A nozzle group in a single column of the ink jet head was used for recording.

An LED was disposed on each of the right and left sides of the ink jet head on the carriage. The peak wavelength of the LED used as a radiation source was 395 nm. The radiation source had the same linear dimension as the ink jet head in the vertical direction T. Furthermore, the distance from the center of the whole head in the scanning direction to the left light source and the distance from the center of the whole head in the scanning direction to the right light source were substantially the same and 160 mm. The ultraviolet ray irradiation intensity from the LED was a value given in Table 2. For the measurement of the irradiation intensity, an illuminometer UM-10 (receptor portion UM-400) manufactured by KONICA MINOLTA SENSING, INC. was used. The irradiation intensity measured herein is an intensity at the distance from the LED light source to the surface of a recording medium during recording.

The composition ejected and landed in a scan was irradiated in the same scan with the ultraviolet ray by a radiation source mounted downstream in the scanning direction of the carriage. At this time, the irradiation energy in a single irradiation was 200 mJ/cm$^2$. A shutter wad disposed at the light emitting surface of the light source to restrict the irradiation area and to enable adjustment of the time for continuously irradiating a certain spot of the recording medium in a scan, and the irradiation energy was adjusted to be the above-described value. The irradiation energy was calculated by intensity X irradiation time (s).

Bi-directional printing was performed at a scan speed of 500 mm/s. Herein, scan speed refers to a carriage moving speed in a serial printer and is a medium transporting speed in a line printer.

Furthermore, the ink jet head includes a heating mechanism. The heating mechanism adjusts the heating temperature of each composition so as to adjust the viscosity of the composition to a value not higher than 12 mPa·s, and thereafter, the composition was ejected.

2.2. Printer Structure P2

L-4533A manufactured by SEIKO EPSON CORPORATION was modified to produce a line printer, printer structure P2. Plural ink jet heads were aligned to form the line head. The nozzle density was 600 npi. At a position 160 mm downstream from the line head in the medium transporting direction, a LED light source having the same linear dimension as the head was disposed.

2.3. Recording Condition

The recording conditions were as follows: the recording resolution was 600×600 dpi, and the number of scans was given in Table 2. The number of scans can be calculated by the formula described below. The number of scans refers to the number of scans in which the head faces a certain spot on a recording medium. The composition can be ejected separately in such a number of scans. Printer structure P2 is a line-type printer and thus performs printing in a single scan. As the recording medium, a polyvinyl chloride film (JT5829R, manufactured by Mactac) was used.

the number of scans=dimension of head/approximate distance of a single sub-scan

3. Evaluation Method 3.1. Evaluation of Curability

Recording was performed under the recording test conditions. A scan in which attaching an ink to a recording medium and irradiating the recording medium were performed was conducted only once using each of the serial-type printer structure P1 and the line-type printer structure P2. The irradiation energy in a single irradiation was 200 mJ/cm$^2$.

The cured film of the composition on the recording medium was rubbed with a Johnson's cotton swab manufactured by Johnson & Johnson. Rubbing was performed for 20 reciprocating cycles under a load of 50 g. Evaluation criteria are as follows.

Evaluation Criteria

A: No scratch was formed on the pattern, and the ink was not attached to the cotton swab.

B: A scratch was not visually confirmed on the pattern; however, the composition was confirmed to be attached to the cotton swab.

C: Slight scratches were confirmed on the pattern, and the composition was confirmed to be attached to the cotton swab.

D: Noticeable scratches were confirmed on the pattern.

3.2. Evaluation of Streak

Recording was performed in conformity with the recording test, except that the dot density in a scanning direction was adjusted so as to attach the composition to the recording medium in an amount of 10 μm/inch$^2$ to record a solid pattern with a size of 10 cm×10 cm. The obtained solid pattern was observed with the naked eye and with a magnifier to evaluate streaks. Evaluation criteria are as follows.

Evaluation Criteria a: A portion in which the ink is thin that linearly extends in a scanning direction (streak) is visible neither to the naked eye nor with a magnifier.

B: Streaks are not visible to the naked eye, but visible with a magnifier.

C: Streaks are slightly visible to the naked eye.

D: Streaks are noticeably visible to the naked eye.

3.3. Ejection Stability

Under the recording test conditions, recording was continuously performed for 120 minutes. After recording, the presence of faulty ejection of nozzles (non-ejection or misalignment of a landing position) was checked. Regarding the misalignment of a landing position, when the distance from the actual landing position of the ink ejected from a nozzle to the predetermined landing position was equal to or more than half of the distance from the nozzle to the adjacent nozzle, the nozzle was determined as a nozzle with faulty ejection. A nozzle that did not eject the ink or caused misalignment of a landing position in the above range was defined as a faulty ejection nozzle. Evaluation criteria are as follows.

Evaluation Criteria

A: The ratio of faulty ejection nozzles is less than 1%. Non-ejection did not occur.

B: The ratio of faulty ejection nozzles is 1% or more and less than 3%. Non-ejection did not occur.

C: The ratio of faulty ejection nozzles is 3% or more and less than 6%. Non-ejection did not occur.

D: A faulty ejection nozzle caused non-ejection.

3.4. Adhesion

A portion of the recorded pattern of the recorded medium, which had been obtained in the recording test, was subjected to a cross-cut test in conformity with JIS K5600-5-6 and evaluated. More specifically, the blade of a cutting tool, such as a cutter, was placed orthogonal to the coating film, and notches were made at intervals of 1 mm in the coating film so as to form a grid, thereby making a 10×10 lattice. A transparent adhesive tape of about 75 mm in length (width 25 mm) was attached to the lattice, and the tape was rubbed sufficiently with a finger such that the cured film could be seen through the tape. Next, within five minutes after the tape was attached, the tape was reliably peeled off from the cured film at an angle of about 60° in 0.5 to 1.0 seconds, and the state of the lattice was visually observed. Evaluation criteria are as follows.

Evaluation Criteria

A: separation of the cured film was not confirmed in the lattice.

B: Separation of cured film was confirmed in less than 5% of the lattice.

C: Separation of the cured film was confirmed in 5% or more and less than 35% of the lattice.

D: Separation of the cured film was confirmed in 35% or more of the lattice.

generation of streaks and the ejection stability are particularly enhanced. The comparison of the results of Examples 1 and 7 and the comparison of the results of Examples 2 and 8 show that a cyclic amide monomer further enhances the curability and the adhesion and that a nitrogen-containing heterocycle further enhances suppression of the generation of streaks and the ejection stability. The results of Examples 9 and 10 show that as the amount of monofunctional monomers increases, the curability and the suppression of the generation of streaks are further enhanced. The results of Examples 11, 13, and 14 show that as the irradiation intensity increases, the curability and the adhesion are

TABLE 2

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Ink No. | 1 | 2 | 3 | 4 | 5 | 6 | 7 | 8 | 9 | 10 | 1 | 1 | 1 | 1 | 1 |
| Light source | LED | LED | LED | LED | LED | LED | LED | LED | LED | LED | LED | LED | LED | LED | LED |
| Irradiation intensity (W/cm2) | 5 | 5 | 5 | 5 | 5 | 5 | 5 | 5 | 5 | 5 | 3 | 3 | 8 | 10 | 5 |
| Printer structure | P1 | P1 | P1 | P1 | P1 | P1 | P1 | P1 | P1 | P1 | P1 | P1 | P1 | P1 | P1 |
| Amount of droplet (ng) | 8 | 8 | 8 | 8 | 8 | 8 | 8 | 8 | 8 | 8 | 8 | 14 | 8 | 8 | 12 |
| Number of scans (times) | 8 | 8 | 8 | 8 | 8 | 8 | 8 | 8 | 8 | 8 | 8 | 8 | 8 | 8 | 8 |
| Curability | B | A | A | A | A | C | A | A | B | B | C | A | B | A | A |
| Streaks | A | A | B | B | C | A | B | C | B | C | A | A | B | C | A |
| Ejection stability | A | A | A | B | C | A | B | C | A | A | A | A | B | C | A |
| Adhesion | C | B | B | B | A | C | A | A | B | B | C | C | B | A | C |

| | | Examples | | | | | Comparative Examples | | | | | Reference Examples | |
|---|---|---|---|---|---|---|---|---|---|---|---|---|---|
| | | 16 | 17 | 18 | 19 | 20 | 21 | 1 | 2 | 3 | 4 | 5 | 1 | 2 |
| Ink No. | | 1 | 1 | 1 | 1 | 6 | 5 | 11 | 12 | 13 | 1 | 1 | 1 | 1 |
| Light source | | LED | LED | LED | LED | LED | LED | LED | LED | LED | LED | LED | MHL | MHL |
| Irradiation intensity (W/cm2) | | 5 | 5 | 5 | 5 | 5 | 5 | 5 | 5 | 5 | 2 | 11 | 2 | 5 |
| Printer structure | | P1 | P1 | P1 | P1 | P2 | P2 | P1 | P1 | P1 | P1 | P1 | P1 | P1 |
| Amount of droplet (ng) | | 5 | 8 | 8 | 8 | 8 | 8 | 8 | 8 | 8 | 8 | 8 | 8 | 8 |
| Number of scans (times) | | 8 | 16 | 4 | 1 | 1 | 1 | 8 | 8 | 8 | 8 | 8 | 8 | 8 |
| Curability | | C | B | B | B | B | A | D | D | A | D | A | A | A |
| Streaks | | B | A | B | A | A | A | A | A | D | A | D | A | A |
| Ejection stability | | A | A | A | A | A | C | A | A | D | A | C | A | A |
| Adhesion | | C | C | C | C | C | A | D | D | A | C | A | B | B |

MHL: metal halide lamp

3. Evaluation Results

In Tables, the composition of the radiation-curable ink jet composition in each example and evaluation results are summarized. Table 2 shows that excellent suppression of the generation of streaks and excellent curability are exhibited in each Example corresponding to the recording method of the present embodiment. On the other hand, in each Comparative Example not corresponding to the recording method of the present embodiment, suppression of the generation of streaks or the curability was degraded.

Specifically, the results of Examples 1 to 6 show that as the amount of nitrogen-containing monofunctional monomer increases, the curability and the adhesion are particularly enhanced and that as the amount of nitrogen-containing monofunctional monomer decreases, the suppression of the further enhanced and that as the irradiation intensity decreases, the suppression of the generation of streaks and the ejection stability are enhanced. The comparison of the results of Examples 15 and 16 and the comparison of the results of Examples 11 and 12 show that as the amount of droplet decreases, the curability tends to decrease, and thus, it has been found that there is particularly a problem of degradation of the curability. The result of Example 20 shows that in the line-type system, the suppression of the generation of streaks is particularly enhanced. The results of Comparative Examples 1 and 2 show that when a nitrogen-containing monofunctional monomer is not contained or when the amount of nitrogen-containing monofunctional monomer is small, the curability is degraded. The result of Comparative Example 3 shows that when the amount of nitrogen-containing monofunctional monomer is excessively large, suppression of the generation of streaks is degraded. The results of Comparative Examples 4 and 5 show that when the irradiation intensity is too low, the curability is degraded, and when the irradiation intensity is too high, the suppression of the generation of streaks is degraded. The results of Reference Examples 1 and 2 in which a metal halide lamp was used in place of a light emitting diode show that when a light source having a wide wavelength range is used, a problem of the generation of streaks does not occur. The result of a test performed by using ink 13 under the conditions of Example 20, the result being not given in Table 2, shows that suppression of the generation of streaks is not degraded as much as that in Comparative Example 3. This reveals that a problem of generation of streaks particularly occurs in the serial-type system. In a line-type system, however, recording is performed in a single scan, and thus, a slight fluctuation in the amount of ejected droplets or a slight misalignment of landing position of the droplets in a single scan may lead to generation of visible streaks in images. Therefore, the present disclosure is also useful for the line-type system from the viewpoint of suppression of the generation of streaks.

What is claimed is:

1. An ink jet method comprising:
   an ejecting step of ejecting a radiation-curable ink jet composition from an ink jet head; and
   an irradiating step of irradiating the ejected radiation-curable ink jet composition with an ultraviolet ray at an irradiation intensity of 3 to 10 $W/cm^2$ by using a light emitting diode, wherein
   the radiation-curable ink jet composition contains monofunctional monomers including a nitrogen-containing monofunctional monomer, and
   an amount of the nitrogen-containing monofunctional monomer relative to a total amount of the radiation-curable ink jet composition is 5 to 40 mass %.

2. The ink jet method according to claim 1, wherein an amount of the monofunctional monomers relative to the total amount of the radiation-curable ink jet composition is 80 mass % or more.

3. The ink jet method according to claim 1, wherein the radiation-curable ink jet composition contains a bi- or higher functional polymerizable compound, and
   an amount of the bi- or higher functional polymerizable compound relative to the total amount of the radiation-curable ink jet composition is 15 mass % or less.

4. The ink jet method according to claim 1, wherein the nitrogen-containing monofunctional monomer is a monofunctional monomer having a nitrogen-containing heterocycle or a monofunctional monomer having a cyclic amide structure.

5. The ink jet method according to claim 1, wherein the nitrogen-containing monofunctional monomer is acryloyl morpholine.

6. The ink jet method according to claim 1, wherein irradiation energy of the ultraviolet ray is 100 to 500 $mJ/cm^2$.

7. The ink jet method according to claim 1, wherein the ultraviolet ray has an emission peak wavelength of 360 to 420 nm.

8. The ink jet method according to claim 1, wherein the amount of the nitrogen-containing monofunctional monomer relative to the total amount of the radiation-curable ink jet composition is 5 to 20 mass %.

9. The ink jet method according to claim 1, wherein the ink jet head includes a nozzle group of a plurality of nozzles aligned in a column direction,
   the ejecting step includes a scan in which a carriage having the ink jet head mounted thereon is made to scan in a scanning direction intersecting the column direction and in which the radiation-curable ink jet composition is ejected from the ink jet head, and
   the scan is performed a plurality of times.

10. The ink jet method according to claim 9, wherein the carriage includes a radiation source mounted thereon that is disposed on a side of the ink jet head in a direction opposite to the scanning direction,
    the ejecting step includes a scan performed in the scanning direction, and
    the irradiating step is irradiating the radiation-curable ink jet composition ejected in the scan with an ultraviolet ray from the radiation source in the same scan.

11. The ink jet method according to claim 1, wherein the radiation-curable ink jet composition contains an acylphosphine oxide-based polymerization initiator.

12. The ink jet method according to claim 1, wherein a weight of the composition ejected in the ejecting step for each dot is 12 ng/dot or less.

13. The ink jet method according to claim 1, wherein the ink jet method is a recording method of performing recording on a recording medium, the recording method including
    the ejecting step including attaching the ejected radiation-curable ink jet composition to the recording medium, and
    the irradiating step including irradiating the radiation-curable ink jet composition attached to the recording medium with the ultraviolet ray.

14. An ink jet apparatus comprising:
    an ink jet head that ejects a radiation-curable ink jet composition; and
    a light emitting diode that irradiates the ejected radiation-curable ink jet composition with an ultraviolet ray at an irradiation intensity of 3 to 10 $W/cm^2$, wherein
    the radiation-curable ink jet composition to be ejected contains monofunctional monomers including a nitrogen-containing monofunctional monomer, and an amount of the nitrogen-containing monofunctional monomer relative to a total amount of the radiation-curable ink jet composition is 5 to 40 mass %.

15. The ink jet apparatus according to claim 14, wherein the radiation-curable ink jet composition contains an alicyclic group-containing monofunctional monomer that is at least one selected from tert-butylcyclohexanol acrylate and 1,4-dioxaspiro[4,5]dec-2-ylmethyl 2-(meth)acrylate.

16. The ink jet method according to claim 1, wherein the radiation-curable ink jet composition contains an alicyclic group-containing monofunctional monomer that is at least one selected from tert-butylcyclohexanol acrylate and 1,4-dioxaspiro[4,5]dec-2-ylmethyl 2-(meth)acrylate.

* * * * *